US012684000B2

(12) United States Patent (10) Patent No.: US 12,684,000 B2

Shelke et al. (45) Date of Patent: Jul. 14, 2026

(54) SYSTEMS AND METHODS FOR SIMULATING EVENTS AND ATTACK VECTORS ASSOCIATED WITH EMBEDDED DEVICES USING INJECTABLE GRAMMAR

(71) Applicant: DigiCert, Inc., Lehi, UT (US)

(72) Inventors: Mahendra Shelke, Sunnyvale (CA); Jaydeep Raval, Pune (IN)

(73) Assignee: DigiCert, Inc., Lehi, UT (US)

( * ) Notice: Subject to any disclaimer, the term of this patent is extended or adjusted under 35 U.S.C. 154(b) by 234 days.

(21) Appl. No.: 18/449,894

(22) Filed: Aug. 15, 2023

(65) Prior Publication Data

US 2025/0007943 A1 Jan. 2, 2025

(30) Foreign Application Priority Data

Jun. 30, 2023 (IN) .............................. 202311043874

(51) Int. Cl.
*H04L 9/40* (2022.01)
(52) U.S. Cl.
CPC ................................. *H04L 63/1433* (2013.01)
(58) Field of Classification Search
CPC .................................................. H04L 63/1433
USPC .......................................... 726/25; 709/229
See application file for complete search history.

(56) References Cited

U.S. PATENT DOCUMENTS

| | | | | | |
|---|---|---|---|---|---|
| 7,620,851 | B1 * | 11/2009 | Leavy | ................. | G06F 11/3672 |
| | | | | | 714/41 |
| 7,853,998 | B2 | 12/2010 | Blaisdell et al. | | |

| | | | | | |
|---|---|---|---|---|---|
| 8,843,935 | B2 * | 9/2014 | Hegdal | ............... | G06F 9/45558 |
| | | | | | 718/1 |
| 8,943,354 | B2 * | 1/2015 | Canini | .................. | G06F 11/006 |
| | | | | | 714/4.1 |
| 9,032,060 | B2 | 5/2015 | Blaisdell | | |
| 9,806,979 | B1 * | 10/2017 | Felstaine | ............. | H04L 41/0668 |
| 10,341,321 | B2 | 7/2019 | Kumar et al. | | |
| 10,657,261 | B2 | 5/2020 | Kumar et al. | | |
| 10,764,040 | B2 | 9/2020 | Kumar et al. | | |
| 10,812,516 | B2 * | 10/2020 | Chenette | ............. | H04L 63/1433 |
| 11,206,134 | B2 | 12/2021 | Kumar et al. | | |
| 11,595,217 | B2 | 2/2023 | Kumar et al. | | |
| 2007/0055492 | A1 * | 3/2007 | Wang | .................... | G06F 40/186 |
| | | | | | 704/9 |
| 2008/0118065 | A1 | 5/2008 | Blaisdell et al. | | |

(Continued)

*Primary Examiner* — Liang Che A Wang

(74) *Attorney, Agent, or Firm* — Baratta Law PLLC; Lawrence A. Baratta, Jr.

(57) ABSTRACT

Systems and methods are provided for creating simulations and attack vectors related to events surrounding embedded and/or Internet of Things (IoT) devices using injectable grammar. According to one implementation, a server, arranged in a network environment, includes a processing device and a memory device configured to store a management program having logic. The logic enables the processing device to perform a step of incorporating a grammar template into the management program. The management program includes a grammar template that simulates events associated with the embedded devices, and is configured to manage the definition of the associated events. The logic further enables the processing device to perform a step of executing the grammar template in the network environment, yet outside of a sandbox environment, to simulate the events associated with the embedded devices.

20 Claims, 8 Drawing Sheets

120

INCORPORATE A GRAMMAR TEMPLATE INTO A MANAGEMENT PROGRAM CONFIGURED TO MANAGE EMBEDDED DEVICES, WHEREIN THE GRAMMAR TEMPLATE IS CONFIGURED TO SIMULATE EVENTS ASSOCIATED WITH THE EMBEDDED DEVICES

122

EXECUTE THE GRAMMAR TEMPLATE IN A NETWORK ENVIRONMENT, YET OUTSIDE OF A SANDBOX ENVIRONMENT, TO SIMULATE THE EVENTS ASSOCIATED WITH THE EMBEDDED DEVICES

124

(56) References Cited

U.S. PATENT DOCUMENTS

| | | | |
|---|---|---|---|
| 2009/0158282 A1 | 6/2009 | Blaisdell et al. | |
| 2009/0222916 A1 | 9/2009 | Blaisdell | |
| 2010/0088769 A1 | 4/2010 | Ferino et al. | |
| 2012/0137364 A1 | 5/2012 | Blaisdell | |
| 2013/0138969 A1 | 5/2013 | Blaisdell | |
| 2013/0305228 A1 | 11/2013 | Black et al. | |
| 2013/0343543 A1 | 12/2013 | Blaisdell et al. | |
| 2014/0047275 A1* | 2/2014 | Eddington | G06F 11/3672 |
| | | | 714/37 |
| 2015/0317482 A1 | 11/2015 | Blaisdell et al. | |
| 2020/0067915 A1 | 2/2020 | Kumar et al. | |
| 2020/0169539 A1 | 5/2020 | Kumar et al. | |
| 2020/0301764 A1* | 9/2020 | Thoresen | G06F 9/45541 |

* cited by examiner

*10*

*18*

MEMORY DEVICE *24*

O/S *34*

MANAGEMENT PROGRAM *36*

PROCESSING DEVICE *22*

OTHER PROGRAMS *38*

MONITORING MODULE *40*

SIMULATION MODULE *42*

*32*

INPUT/OUTPUT INTERFACES *26*

NETWORK INTERFACE *28*

DATA BASE *30*

INTERNET

*14*

SIMULATION MODULE *42*

DEPLOYMENT SIMULATOR *46*

ATTACK SIMULATOR *48*

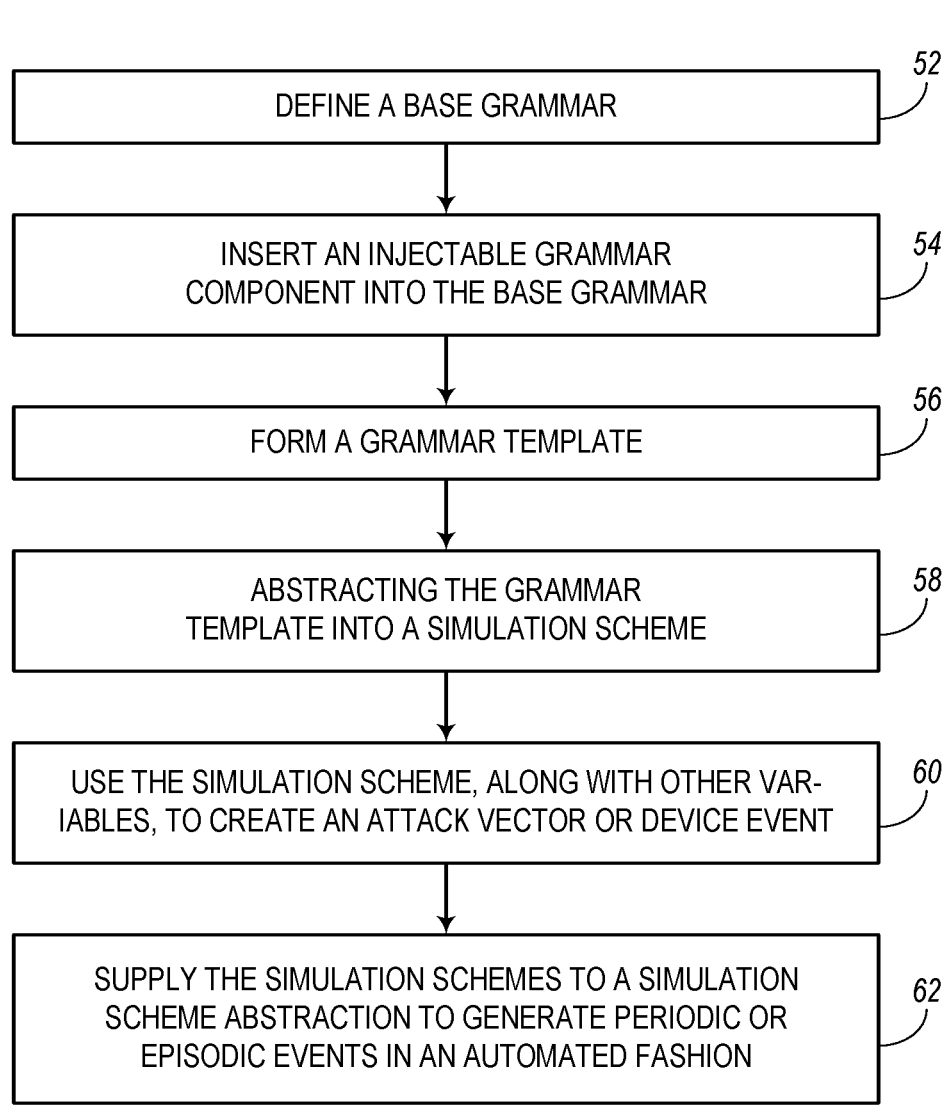

50

| DEFINE A BASE GRAMMAR | 52 |

| INSERT AN INJECTABLE GRAMMAR COMPONENT INTO THE BASE GRAMMAR | 54 |

| FORM A GRAMMAR TEMPLATE | 56 |

| ABSTRACTING THE GRAMMAR TEMPLATE INTO A SIMULATION SCHEME | 58 |

| USE THE SIMULATION SCHEME, ALONG WITH OTHER VAR-IABLES, TO CREATE AN ATTACK VECTOR OR DEVICE EVENT | 60 |

| SUPPLY THE SIMULATION SCHEMES TO A SIMULATION SCHEME ABSTRACTION TO GENERATE PERIODIC OR EPISODIC EVENTS IN AN AUTOMATED FASHION | 62 |

FIG. 4

```
[BEGIN]
[LOOP]
"secsPerEvent=${randomizer.getSecsPerEvent(template.fromDate, template.toDate, template.numberOfEventsToGenerate)}"
{
  "data": {
    "header": {
      "name": "Bluetooth Pairing Notification",
      "cat": "${${randomizer.getRandomString(template.category)}}",
      "severity": "${${randomizer.getRandomNumber(template.severityFrom, template.severityTo)}}",
      "timestamp": "${${randomizer.getRandomDate(template.fromDate, secsPerEvent, eventNumber)}}",
      "signatureId": {
        "policyId": "${${randomizer.getRandomNumber(template.policyIdFrom, template.policyIdTo)}}",
        "ruleId": "${${randomizer.getRandomNumber(template.ruleIdFrom, template.ruleIdTo)}}"
      },
      "occurrence": "${${randomizer.getRandomNumber(1, 20)}}",
      "isSimulated": "true"
    },
    "event": "INJECT[${randomizer.injectExternalTemplate('BLUETOOTH_PAIRING',template.template)}] [INJECT END]",
    "verification": {
      "digitalSignature": "[${randomizer.getRandomAlphanumeric(256)}]",
      "certificateSerialNumber": "[${randomizer.getRandomAlphanumeric(100)}]",
      "certificateIssuerName": "[${randomizer.getRandomAlphanumeric(100)}
        "CN=c1-c.root.moetclab",
        "CN=ATHENA-CA,athenaserver.local",
        "CN=GlobalSign CloudSSL CA - SHA256 - G3,GlobalSign nv-sa,BE",
        "CN=AZTCCLOUD-tcaAcs-CA,AZTCCLOUD.COM",
        "CN=moetclab-TC-WIN2019-as-CA,moetclab.net"
      getRandomValue]"
    }
  }
  "ruleId": "[${${randomizer.getRandomValue('RSA-SHA384','RSA-SHA256','RSA-SHA512')}}]"
}
[LOOP END]
[END]
```

```
1   {
2       "PID": "randomInteger(1,4096)",
3       "parentPID": "randomInteger(1,4096)",
4       "fname": "randomAlphanumeric(10)",
5       "filePath": "randomString('/etc/rc1.d/S90/',10)",
6       "process": "randomString('ln',4)",
7       "deviceId": "randomAlphanumeric(16)",
8       "applicationId": "randomString('App~',4)"
9   }
```

FIG. 6

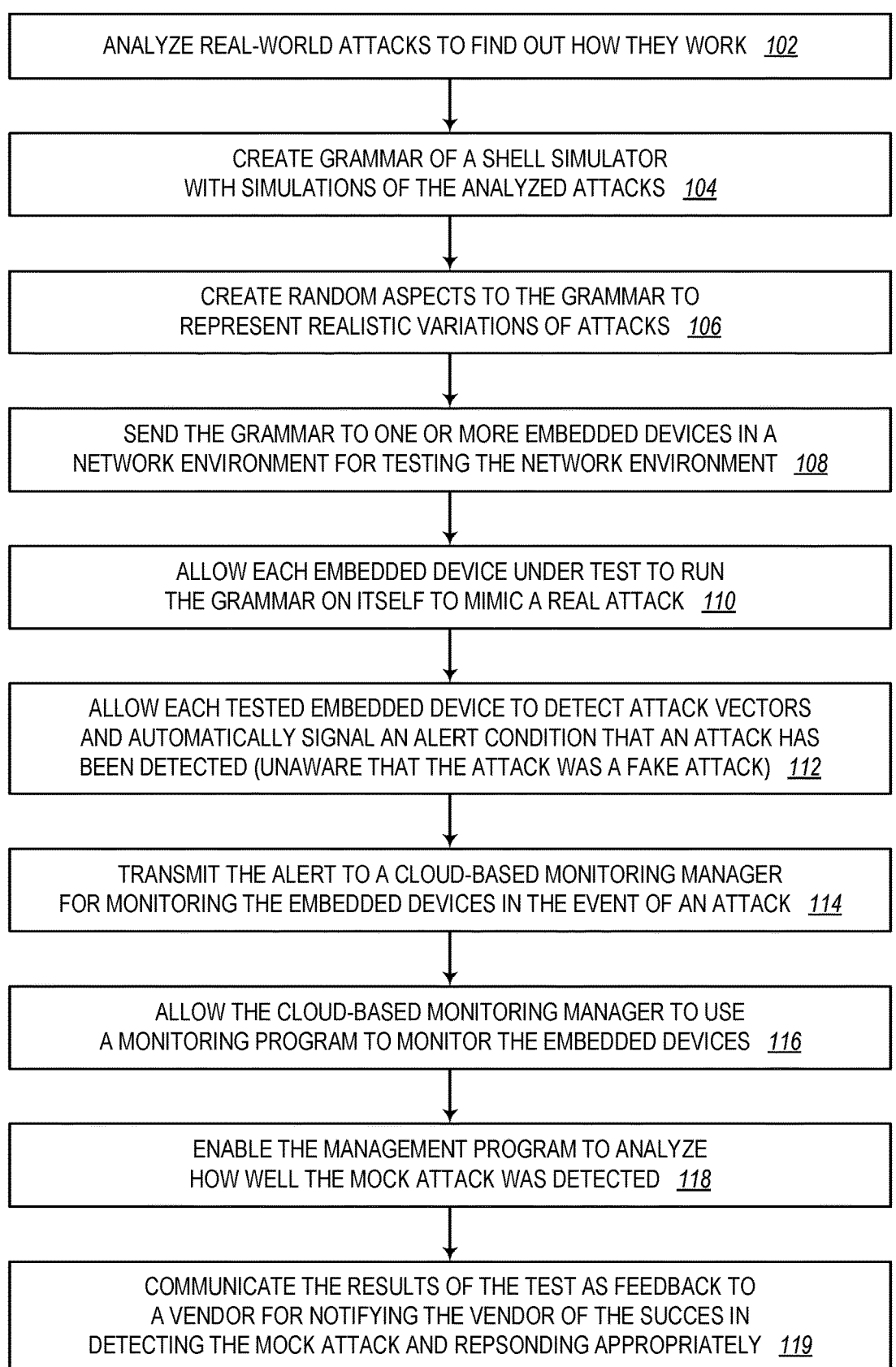

ANALYZE REAL-WORLD ATTACKS TO FIND OUT HOW THEY WORK  _102_

CREATE GRAMMAR OF A SHELL SIMULATOR
WITH SIMULATIONS OF THE ANALYZED ATTACKS  _104_

CREATE RANDOM ASPECTS TO THE GRAMMAR TO
REPRESENT REALISTIC VARIATIONS OF ATTACKS  _106_

SEND THE GRAMMAR TO ONE OR MORE EMBEDDED DEVICES IN A
NETWORK ENVIRONMENT FOR TESTING THE NETWORK ENVIRONMENT  _108_

ALLOW EACH EMBEDDED DEVICE UNDER TEST TO RUN
THE GRAMMAR ON ITSELF TO MIMIC A REAL ATTACK  _110_

ALLOW EACH TESTED EMBEDDED DEVICE TO DETECT ATTACK VECTORS
AND AUTOMATICALLY SIGNAL AN ALERT CONDITION THAT AN ATTACK HAS
BEEN DETECTED (UNAWARE THAT THE ATTACK WAS A FAKE ATTACK)  _112_

TRANSMIT THE ALERT TO A CLOUD-BASED MONITORING MANAGER
FOR MONITORING THE EMBEDDED DEVICES IN THE EVENT OF AN ATTACK  _114_

ALLOW THE CLOUD-BASED MONITORING MANAGER TO USE
A MONITORING PROGRAM TO MONITOR THE EMBEDDED DEVICES  _116_

ENABLE THE MANAGEMENT PROGRAM TO ANALYZE
HOW WELL THE MOCK ATTACK WAS DETECTED  _118_

COMMUNICATE THE RESULTS OF THE TEST AS FEEDBACK TO
A VENDOR FOR NOTIFYING THE VENDOR OF THE SUCCES IN
DETECTING THE MOCK ATTACK AND REPSONDING APPROPRIATELY  _119_

INCORPORATE A GRAMMAR TEMPLATE INTO A MANAGEMENT PROGRAM CONFIGURED TO MANAGE EMBEDDED DEVICES, WHEREIN THE GRAMMAR TEMPLATE IS CONFIGURED TO SIMULATE EVENTS ASSOCIATED WITH THE EMBEDDED DEVICES

122

EXECUTE THE GRAMMAR TEMPLATE IN A NETWORK ENVIRONMENT, YET OUTSIDE OF A SANDBOX ENVIRONMENT, TO SIMULATE THE EVENTS ASSOCIATED WITH THE EMBEDDED DEVICES

124

SYSTEMS AND METHODS FOR SIMULATING EVENTS AND ATTACK VECTORS ASSOCIATED WITH EMBEDDED DEVICES USING INJECTABLE GRAMMAR

TECHNICAL FIELD

The present disclosure generally relates to network security systems and methods. More particularly, the present disclosure relates to testing a system by generating a first simulation of events of a mock deployment of embedded device into a network environment and by generating a second simulation of events of a mock attack on embedded devices already deployed in the network environment.

BACKGROUND

In the context of a computer network, an "embedded device" or "embedded system" generally refers to a simple computing device that is housed within (and/or hosted by) a larger electronic, electrical, or electromechanical device. For example, some embedded devices or Internet of Things (IoT) devices and can relay registration information and telemetry data to a remote cloud-based server that can monitor multiple embedded devices. According to one example, an embedded device may be housed within a kitchen appliance (e.g., refrigerator) for initially uploading registration information about the kitchen application (e.g., serial number, model number, purchaser information, etc.) when this product is first plugged in and connected online. Also, according to this example, the embedded device may convey operating conditions of the kitchen appliance to the cloud-based server in order to allow the cloud-based server to monitor, for example, whether maintenance may be required on the host device. In its simplest form, an embedded device may include a processing device, memory, and network interface. More advanced embedded devices may further include input/output devices (e.g., peripheral devices, user interfaces, display screens, etc.) to allow users to enter information and/or view alerts or measurements related to the condition of the host device.

BRIEF SUMMARY

The present disclosure is directed to systems and methods for providing simulations of events associated with embedded devices within a network environment or system. According to one implementation, a method may include the step of incorporating a grammar template into the management program. For example, the management program may be configured to manage the definition of events that are associated with a class of embedded devices. Also, the grammar template may be configured to simulate events associated with the embedded devices. Furthermore, the method includes the step of executing the grammar template in the network environment, yet outside of a sandbox environment, to simulate the events associated with the embedded devices. In some embodiments, the grammar template may include a base grammar and an extension, whereby the extension is configured to inject randomization components into the base grammar.

According to various embodiments, the management program may include a simulation module configured to simulate the events associated with the embedded devices according to the grammar template. The simulation module may include a deployment simulator configured to simulate events associated with a deployment of the embedded devices in the network environment. The simulation module may also include an attack simulator configured to simulate events associated with a mock attack on embedded devices deployed in the network environment. The attack simulator may be configured to send telemetry data from one or more of the embedded devices being exposed to the mock attack to determine whether the management program is able to identify the mock attack and respond appropriately.

Furthermore, the management program may include a monitoring module configured to monitor the embedded devices. The monitoring module may be configured to receive information from each of the embedded devices related to one or more of a) an identifier of the embedded device, b) an identifier of an electronic device in which the embedded device is housed, c) telemetry data of the electronic device, d) an alert related to one or more issues with the electronic device, and e) registration information.

Additionally, each embedded device may be implemented as a computing system housed within an electronic or electromechanical device. Each embedded device may be configured to detect operating metrics of the respective electronic or electromechanical device and transmit the operating metrics to a network interface of a managing server (e.g., Trust Service Provider) via the Internet. The embedded devices, in some implementations, may be associated with Internet of Things (IoT) devices.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 4 is a flow diagram illustrating an embodiment of a method related to the operations of the system of FIG. 1 and/or the server of FIG. 2.

FIG. 5 is a screenshot showing an example of a base grammar script that may be used to simulate a Bluetooth event.

FIG. 6 is a screenshot showing an example of an extension script that can be injected into the base grammar script of FIG. 5.

FIG. 8 is a flow diagram illustrating an embodiment of a method for developing mock attacks.

DETAILED DESCRIPTION

The present disclosure relates to systems and methods for employing simulations within a system, such as a large-scale system having many (e.g., millions of devices) connected to the Internet or other large-scale network. Events related to embedded devices can be simulated using a template or base grammar along with a randomization component. The template and injected randomization can be combined to form an abstraction of a grammar configuration having multiple randomized simulation schemes. These can be used to simulate deployment of embedded devices and/or to simulate malicious attacks on the embedded devices.

Traditional device monitoring solutions have posed a challenge. Particularly, there has been a challenge in verifying the monitoring applications with respect to a large number of devices that are configured to produce real-time information, including accurate metadata, signed events, and other activity. The embodiments herein are configured to meet these challenges, such as by using a configurable grammar in a cost effective way. Also, these simulations can be performed without a sandbox, which can provide numerous advantages over conventional systems. The systems and methods of the present disclosure may be configured as pluggable devices and can be incorporated into existing codebases. This may enable efficient load simulation and testing of the application's boundary conditions and internal methods. Moreover, the grammar generated by the embodiments described herein are configured to be accurate to what exists in the real world in order to accurately produce events for collaboration. Thus far, no off-the-shelf product has presented an effective solution to the problem.

Figure 1:
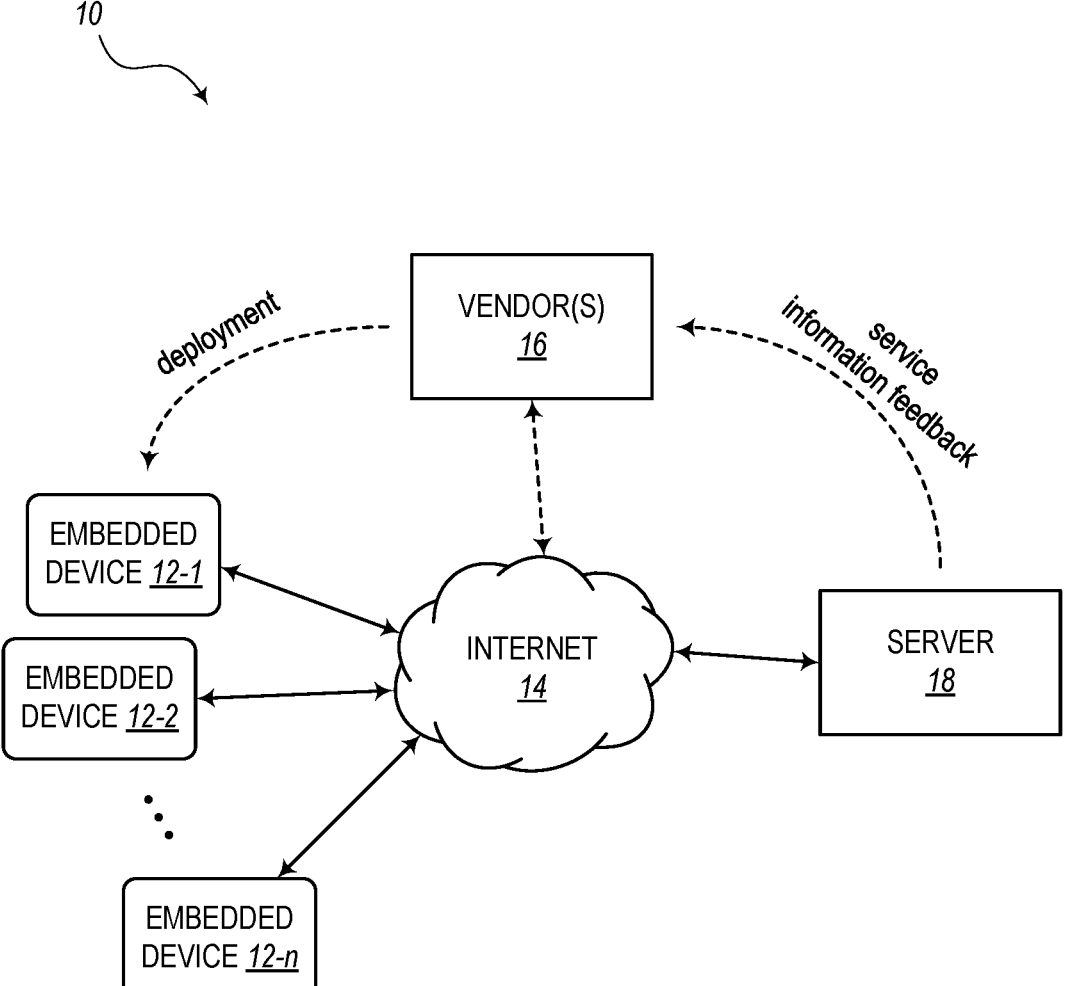
FIG. 1 is a block diagram illustrating an embodiment of a system in which embedded devices are already deployed in a network environment or are scheduled to be deployed in the network environment.

FIG. 1 is a block diagram illustrating an embodiment of a system 10 in which a plurality of embedded devices 12-1, 12-2, . . . , 12-n are either already deployed or are scheduled to be deployed. Each of the embedded devices 12, for example, may be a computing device including, for example, one or more processors (and/or other computer components) embedded within a host device (e.g., electronic, electrical, or electromechanical device) having some main purpose other than computing or processing. The embedded devices 12-1, 12-2, . . . , 12-n may be configured with wired and/or wireless connections to the Internet 14, whereby, when they are deployed, they can access the Internet 14. One or more vendors 16 may be directly or indirectly responsible for the deployment of the embedded devices 12-1, 12-2, . . . , 12-n in the system 10.

The term embedded device 12 is used herein and is meant to include other types of devices, such as Internet of Things (IoT) devices or the like. The embedded devices 12 may include processing or computing capabilities (e.g., using one or more processors or microprocessors, one or more memory components, one or more input/output devices or user interfaces, a network interface, etc.) and may be installed in a larger electronic or electromechanical system. In the example of an embedded device 12 installed in a kitchen appliance, the embedded device 12 can control operations of the kitchen appliance, detect maintenance issues, enable registration of the device when it is first purchased and put into use, communicate with a server 18, etc. The server 18 may be a trust server, security trust manager, embedded or IoT management system, embedded trust manager, or the like. The server 18 may be arranged as a remote device, cloud-based device, online server, etc. Thus, the server 18 may be configured to manage the plurality of embedded device 12-1, 12-2, . . . , 12-n for monitoring operating conditions, receive service requests, automatically order replacement parts, etc.

The vendors 16 may manufacture, sell, and/or install the embedded devices 12 in the system 10 or may allow customers to install the embedded devices 12 themselves. In some embodiments, the vendors 16 may be associated with computing devices (not shown) that can be connected to the Internet 14. The embedded devices 12 may be equipped with automatic registration functionality to enable the embedded device 12 to communicate with the server 18, or, in some cases, with the computing devices associated with the vendors 16. The registration functionality may be enacted when the device is first plugged in for the first time or when there is some type of reset action. The computing devices associated with the vendors 16 may be connected to the Internet 14 to enable them to communicate with the embedded devices 12 and/or server 16. In some embodiments, communications with the embedded devices 12 may be conducted only with the server 18, which can provide many different types of services on behalf of the vendors 16. Also, the server 18 may communicate with the vendors 16 (e.g., via the Internet 14) or through other means to convey service information feedback that may be useful to the vendors 16.

Modern embedded systems are often based on microprocessors (e.g., Digital Signal Processors (DSPs), etc.), memory, peripheral interfaces, etc. Other examples of embedded devices 12 may range in size from small portable devices (e.g., digital or smart watches, MP3 players, etc.) to larger devices (e.g., home appliances, industrial assembly line devices, robots, transport vehicles, traffic light controllers, medical imaging systems, etc.). Embedded devices 12 may also be a subsystem or part of a larger machine (e.g., aircraft). In some cases, embedded devices 12 may be deployed in factories, assembly lines, pipelines, electrical grids, industrial environments, etc.

Figures 2, 3:
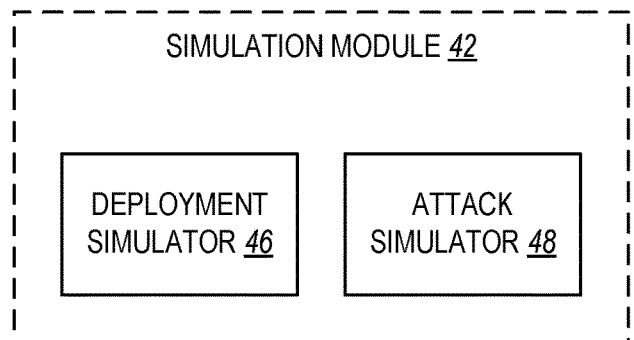
FIG. 2 is a block diagram illustrating an embodiment of the server shown in FIG. 1.
FIG. 3 is a block diagram illustrating an embodiment of the simulation program shown in FIG. 2.

FIG. 2 is a block diagram illustrating an embodiment of the server 18 shown in FIG. 1. In the illustrated embodiment, the server 18 may be a digital computing device that generally includes a processing device 22, a memory device 24, Input/Output (I/O) interfaces 26, a network interface 28 (e.g., connected to the Internet 14), and a database 30. It should be appreciated that FIG. 2 depicts the server 18 in a simplified manner, where some embodiments may include additional components and suitably configured processing logic to support known or conventional operating features. The components (i.e., 22, 24, 26, 28, 30) may be communicatively coupled via a local interface 32. The local interface 32 may include, for example, one or more buses or other wired or wireless connections. The local interface 32 may also include controllers, buffers, caches, drivers, repeaters, receivers, among other elements, to enable communication. Further, the local interface 32 may include address, control, and/or data connections to enable appropriate communications among the components 22, 24, 26, 28, 30.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

As shown in FIG. 2, the memory device 24 may include an Operating System (O/S) 34, a management program 36, and one or more other programs 38. In this embodiments, the management program 36, for example, may include a monitoring module 40 and a simulation module 42. The management program 36 may be configured to perform management functions with respect to the embedded devices 12. It may be noted that the management program 36 may be implemented in any suitable combination of hardware (e.g., in the processing device 22) or software/firmware (e.g., in the memory device 24).

The monitoring module 40, for example, may be configured to monitor telemetry information obtained from the embedded devices 12. The simulation module 42, as described in greater detail below, may be configured to create various simulations for simulating different types of events that the embedded devices 12 may experience and then monitor the results of these simulations using the monitoring module 40. In this respect, the monitoring module 40 and simulation module 42 may function in a coordinated manner.

FIG. 3 is a block diagram illustrating an embodiment of the simulation program 42 shown in FIG. 2. As shown, the simulation program 42 includes a deployment simulator 46 and an attack simulator 48. The deployment simulator 46 may be configured to simulate a condition of the system 10 as if the embedded devices 12 had already been deployed in the system 10. Thus, the deployment simulator 46 can be run before the embedded devices 12 are actually deployed in order to mimic conditions or events of the system 10 after deployment. In this way, the deployment simulator 46 (along with the monitoring module 40) can monitor how the server 18 is able to handle the simulation, which may result in changes to a planned or scheduled deployment as needed.

The server 18 (e.g., embedded trust manager or the like) thus includes monitoring and analytics capabilities to allow the server 18 to monitor the embedded devices 12 and various events associated with the embedded devices 12. The management program 36 is configured to create intelligence about device activity using telemetry based on kernel drivers and events generated from them. Information related to these events may be collected and analyzed to generate a score for each event found. The server 18 is also configured to perform device attestation to ensure the integrity of the embedded devices 12. The simulation module 42 is configured to accurately simulate millions of unique events from more than a million embedded devices with effective randomization. To address this, the simulation module 42 (e.g., device simulator), as described in more detail below, may start with a base (or template) grammar (e.g., script) and extend the base grammar with a randomization component to simulate various types of events. The combination of the base grammar and the extension may be referred to as a "simulation scheme" having a higher level of abstraction. Because of the relatively low level of complexity and basic design of these simulation schemes, the simulation schemes can be rapidly scaled up to millions of distinct events.

In addition to simulating a deployment of hundreds of thousands (or even millions) of embedded devices, the simulation module 42 also includes the attack simulator 48, which may be run after the embedded devices 12 have already been deployed. The attack simulator 48 may be configured, for example, to mimic some behaviors of malicious software or firmware, but without any of the negative consequences of real attacks. By simulating attack conditions in the system 10, the attack simulator 48 (with the monitoring module 40) is able to see how the server 18 is able to handle the monitoring and detection of these mock attacks, which can reveal deficiencies that might need to be worked out as well.

In addition to that, by applying similar simulation principles, the simulation module 42 is able to address the challenge of how to effectively test these events in the real world to ensure their accuracy in the presence of actual malware activity. The functionality of the attack simulator 48, therefore, may be based on studies of the activities of a selection of known device malware components. The attack simulator 48 may include a shell simulator, which can be deployed on target devices to accurately generate attack vectors. The simulation module 42 may be related to a tool running on a processing component (e.g., Raspberry Pi device), which can then be analyzed and co-related.

Hence, in response to running the deployment simulator 46, the server 18 may be configured to provide feedback to the vendors 16 regarding the success or failure of the simulations with respect to an upcoming deployment plan. Also, in response to running the attack simulator 48, the server 18 can also provide feedback to the vendors 16 regarding the success or failure of the simulations with respect to detection and reactions to mock attacks.

FIG. 4 is a flow diagram illustrating an implementation of a process 50 related to the operations of the system 10 (or, in particular, the operations of the server 18). The process 50 starts by defining a base grammar, as indicated in block 52. One example of a base grammar is shown in FIG. 5. Next, the process 50 includes inserting an injectable grammar component (as shown in FIG. 6) into the base grammar, as indicated in block 54. The insertion of the injectable grammar component is configured to enable the simulation module 42 to vary the data related to simulated events. Thus, block 54 may include enabling the events to be varied in a sequential and/or randomized fashion to create different events that may be more realistic in the network environment (e.g., system 10).

For example, an installer event can include various subcategories (e.g., installation, uninstallation, removal of files, addition of new files (temporary or configuration files), etc.). The management program 36 may take these things into account via the extension of the base grammar (e.g., as shown in FIG. 7).

The process 50 further includes forming a grammar template, as indicated in block 56, where the grammar template may include a combination of the base grammar (e.g., FIG. 5) and the extension (e.g., FIG. 6). The process 50 further includes abstracting the grammar template into a simulation scheme, as indicated in block 58. For example, the created simulation schemes are shown in the grammar template 90 of FIG. 7. The simulation schemes, along with a few other variables, may be used to create an attack vector or device event, as indicated in block 60. The process 50 also includes supplying the simulation schemes to a simulation scheme abstraction to generate periodic or episodic events in an automated fashion, as indicated in block 62. It may be noted that the process 50 may effectively be scaled to millions of embedded devices 12, by generating simulated or mock real-time events. According to experimentations, the process 50 was tested for a setup having almost 200 million events generated by about 1 million devices, with minimal development effort on a small form factor Intel NUC device, and provided favorable results.

FIG. 5, as referenced above, is a screenshot showing a base grammar script 70. For example, the base grammar script 70 may be used as a simulated Bluetooth event. FIG. 6, as referenced above, is a screenshot showing an extension 80, which can be inserted in (or injected in) the base grammar script 70 of FIG. 5. As mentioned with respect to block 56 of the process 50 of FIG. 4, the base grammar script 70 and extension 80 may be combined to form a grammar template, such as the grammar template 90 shown in FIG. 7.

Figure 7:
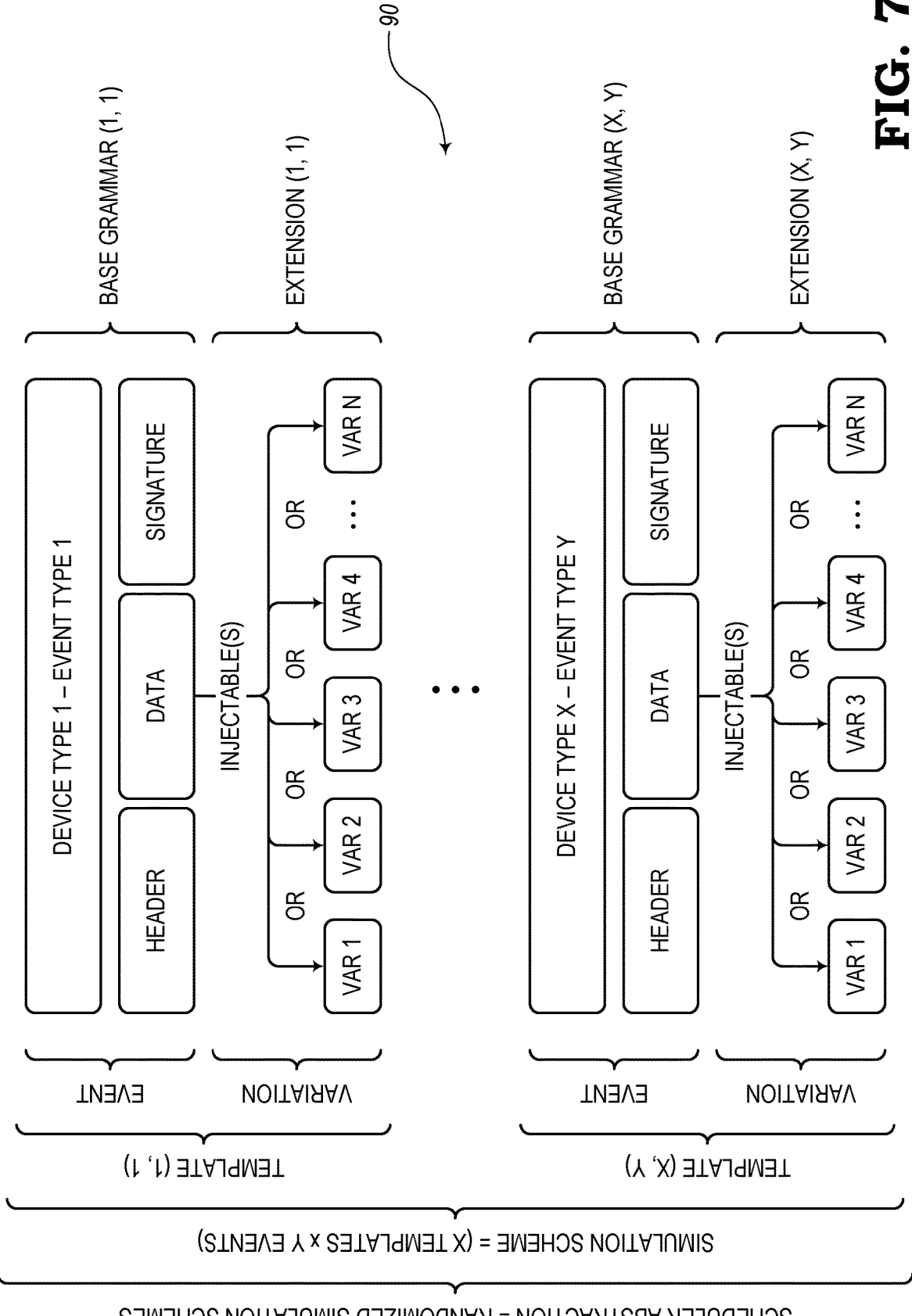
FIG. 7 is a diagram illustrating an embodiment of a grammar template, which may include a combination of the base grammar script of FIG. 5 and the extension of FIG. 6.

FIG. 7 is a diagram illustrating an embodiment of a grammar template 90 (or scheduler abstraction). As illustrated, the grammar template 90 includes a plurality templates, labelled "Template (X, Y)," where X is the number of device types to be defined and Y is the number of event types to be defined. Thus, the number of templates ranges from Template (1, 1) to Template (X, Y). Each template includes a base grammar (X, Y) defining an event and an extension (X, Y) defining variations. The variations of the extensions may include, for example, different variation 1 through N, which can be added to the base grammar.

The combination of the templates (i.e., Template (1, 1) through Template (X, Y)) results in a "simulation scheme." The number of simulation schemes may be equal to X templates times Y events. From the simulation schemes, the grammar template 90 includes a scheduler abstraction, which may be equal to the number of possible randomized simulation schemes.

According to some embodiments, an abstraction of the grammar template 90 may include a method for creating the simulation scheme, which can help to further randomize the structure of the grammar template 90. The abstraction may include a user selection of a template with randomized data templates embedded in it, and multiple randomized template grammars (or base grammars) from the simulation scheme, which can be used to formulate an attack and generate an event. For example, this can be described as follows:

Simulation Scheme=Random(Templates{T1 . . . Tn}*(Number of events+Delay+Duration))

The following is a non-exhaustive list of events that may be supported by the systems and methods of the present disclosure (along with grammar that may be created and extended with respect to these events):

a) Bluetooth Pairing Notifications b) File System Notifications (e.g., 1) Close, 2) Create, 3) CreateDir, 4) Delete, 5) Hardlink, 6) Modify, 7) Permission, 8) Rename, 9) Softlink, etc.)

c) Local Attestation Reports d) Network Access Control Alerts e) Package Manager Notifications (Install, Rollback, Uninstall)

f) System Profiles g) USB Device Alerts h) Wi-Fi Network Alerts i) and others.

Within the grammar, custom functions allowing users to randomize data may also be included, which can provide developers with added flexibility. The following is a non-exhaustive list of supported functions in this respect and may be related to the extension 80 of FIG. 6:

a) Process Identifiers ("PID")—includes randomInteger (rangeStart, rangeEnd) configured to randomly generate PID values from rangeStart to rangeEnd b) Parent PIDs ("parentPID")—includes randomInteger (rangeStart, rangeEnd) configured to randomly generate PID value from rangeStart and rangeEnd to provide actual process identifiers c) File Names ("fname")—includes (1) test (length 16) configured to provide actual file name, (2) random-String (prefix, length) (length 16) configured to randomly generate prefix based file name of specified length (e.g., randomString ('index', 3), (3) oneFrom (string[ ]) (length 16) configured to randomly select an value from list of values (e.g., oneFrom ('mirai.conf', 'index.txt'), and (4) randomAlphanumeric (length 16) configured to randomly generate file name of specified length (e.g., randomAlphanumeric (10))

d) File Path ("filePath")—includes (1)/user/local/device-.conf (length 200) configured to provide actual file path, (2) randomString (prefix, length) (length 200) configured to randomly generate prefix based file path of specified length (e.g., randomString ('/var/www/', 8), and (3) oneFrom (string[ ]) (length 200) configured to randomly select a value from list of values (e.g., oneFrom ('/var/www/html/mirai/index_tem-plate.html', '/var/www/html/mirai/index.html')

e) Process ("process")—includes (1) touch (length 30) configured to provide actual process name, (2) random-String (prefix, length) (length 30) configured to randomly generate prefix based process name of specified length (e.g., randomString ('touch', 3), and (3) one-From (string[ ]) (length 30) configured to randomly select a value from list of values (e.g., oneFrom ('touch', 'mkdir', 'nano')

f) Device ID ("deviceID")—includes (1) Device-1234567 (length 16) configured to provide actual device identifier, (2) randomAlphanumeric (length) (length 16) configured to randomly generate device ID of specified length (e.g., randomAlphanumeric (16)), and (3) randomString (prefix, length) (length 16) configured to randomly generate prefix based device identifier of specified length (e.g., randomString ('device-', 6)

g) Application ID ("applicationID")—includes (1) App-032 (length 8) configured to provide actual application identifier, (2) randomString (prefix, length) (length 8) configured to randomly generate prefix based application identifier of specified length (e.g., randomString ('App-', 4)), and (3) oneFrom (string[ ]) (length 8) configured to randomly select a value from list of values (e.g., oneFrom ('App-1234', 'App-5678', 'App-3456')

FIG. 8 is a flow diagram illustrating an embodiment of a method 100 for developing mock attacks. As shown, the method 100 includes a step of analyzing real-world attacks to find out how they work, as indicated in block 102. The method 100 further includes creating grammar of a shell simulator with simulations of these attacks, as indicated in block 104. Of course, the simulation is created without the destructive parts of the attack malware components. Next, the method 100 includes creating random aspects to the grammar to represent realistic variations of attacks, as indicated in block 106. At this point, according to various implementations, the method 100 includes sending the grammar to one or more embedded devices for testing the system, as indicated in block 108.

The method 100 further includes the step of allowing each tested embedded device to run the grammar (on itself) to mimic an attack, as indicated in block 110. This step should cause the device (if designed properly) to detect attack vectors and automatically signal an alert that there has been an attack (not knowing that it was fake attack), as indicated in block 112. The alert is transmitted to a cloud-based monitoring manager (e.g., server 18) for monitoring the embedded devices in the event of an attack, as indicated in block 114.

Next, the method 100 includes the step, performed by the cloud-based monitoring manager, of using a monitoring program (incorporated in the monitoring manager) to monitor the embedded devices, as indicated in block 116. It may be noted that the monitoring manager (e.g., monitoring module 40) may know up front (e.g., from the simulation module 42) that the alerts are related to a simulated attack event and that the detected attack is merely a test. A management component (e.g., management program 36) of the cloud-based monitoring manager (e.g., server 18) may then be configured to analyze how well the monitoring module 40 was able to pick up the mock attack, as indicated in block 118. At this point, the cloud-based server may be configured to communicate the results of the test as feedback to the vendors, as indicated in block 119, for notifying the vendors of the success of the cloud-based server to detect an attack and respond appropriately.

The principles outlined above may be used to enable the incorporation of suitable hardware, software, and/or firmware to different platforms and languages. In some cases, the low-complexity of the grammar can take advantage of low-resource environments (e.g., Raspberry Pi, etc.). The analyzing of real-world attacks (e.g., block 102) may include studying the activities of selected device malware components, which can lead to the development of a shell simulator (e.g., block 104). This shell simulator can be applied to the target device (e.g., block 108) to accurately produce attack vectors (e.g., block 110).

A tool running on a Raspberry Pi device of the target devices may be defined as a Malware Attack Vector Generator. The tool in this case may include any number and type of attacks that can be obtained. For example, when new attacks are studied and analyzed, the new attacks can be added to the list included in the tool. The following is a non-exhaustive list of some attacks that may be included in the tool:

1) Spike Attack
2) Prowli Attack
3) Psyb0t Attack
4) Elknot Attack
5) Mozi Attack
6) Mirai Attack
7) XOR-DDos Attack
8) Kaiji Attack
9) Evil Gnome Attack
10) Hajime Attack 11) Bashlite Attack
12) Luabot Attack
13) Nyadron Attack
14) Remaiten Attack
15) and others Therefore, the systems and methods of the present disclosure include many advantages and improvements over conventional systems. For example, the present disclosure describes embodiments that provide the ability to conduct testing, load testing, and attack vector simulations safely. Particularly, the tests and simulations can be run without also running a sandbox. Also, the solution defined herein can provide cost-effective implementations that can be expanded at scale with minimal programming effort. Currently, there are no off-the-shelf products that are able to do this. The embodiments may have many applications across various industries and domains. In some embodiments, the systems and methods may also be extended to include models that can further auto-generate scripts for device platforms based on the simulation schemes and the underlying grammar. The target language, for example, may be any suitable shell script (e.g., Bash, Perl, Python, etc.) for accurate simulation of events.

In some embodiments, the management program 36 may be configured with various combinations of the monitoring module 40 and simulation module 42 (e.g., for deployment simulations and/or attack simulations) to provide the functions described in the present disclosure along with other possible functions. For example, the management program 36 may be configured to create a digital force field for every embedded device 12 or connected device. It can provide plug-and-play protections for embedded devices 12 in the field with embedded security applications. It can provide faster enrollment and organization-wide monitoring through unchangeable device identity. It can speed up onboarding and get end-to-end visibility for every device—no matter the scale—with built-in unalterable identifiers. It can monitor and shield embedded devices 12 and IoT devices with digital trust. It can use device-level rules-based network access controls to create an embedded security perimeter. It can provide multifactor verification and other functionality during a boot sequence and can keep compromised machines from starting with multifactor verification-enabled boot sequences that protect against device tampering or unauthorized access.

Figure 9:
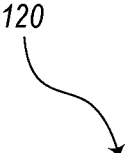
FIG. 9 is a flow diagram illustrating an embodiment of a method for executing a simulation procedure with respect to a system.

FIG. 9 is a flow diagram illustrating an embodiment of a method 120 for executing a simulation procedure with respect to a system (e.g., system 10). In some embodiments, the method 120 may be executed by the server 18. More particularly, the method 120 may be incorporated in a non-transitory computer-readable medium (e.g., the memory device 24) and include logic, code, or instructions for enabling the processing device 22 to perform certain simulation functions. For example, the method 120 may be part of the management program 36 shown in FIG. 2 and may be incorporated, at least in part, within the simulation module 42.

As illustrated in FIG. 9, the method 120 may include the step of incorporating a grammar template into the management program, as indicated in block 122. For example, the management program may be configured to manage embedded devices (e.g., embedded devices 12). Also, the grammar template may be configured to simulate events associated with the embedded devices. Furthermore, the method 120 includes the step of executing the grammar template in the network environment, yet outside of a sandbox environment, to simulate the events associated with the embedded devices, as indicated in block 124. In some embodiments, the grammar template may include a base grammar (e.g., base grammar script 70) and an extension (e.g., extension script 80), whereby the extension is configured to inject randomization components into the base grammar.

According to various embodiments, the management program (block 122) may include a simulation module (e.g., simulation module 42) configured to simulate the events associated with the embedded devices according to the grammar template. The simulation module may include a deployment simulator (e.g., deployment simulator 46) configured to simulate events associated with a deployment of the embedded devices in the network environment. The simulation module may also include an attack simulator (e.g., attack simulator 48) configured to simulate events associated with a mock attack on embedded devices deployed in the network environment. The attack simulator may be configured to receive telemetry data from one or more of the embedded devices being exposed to the mock attack to determine whether the management program is able to identify the mock attack and respond appropriately.

Furthermore, the management program (block 122) may include a monitoring module (e.g., monitoring module 40) configured to monitor the embedded devices when the embedded devices are deployed within the network environment. The monitoring module may be configured to receive information from each of the embedded devices related to one or more of a) an identifier of the embedded device, b) an identifier of an electronic device in which the embedded device is housed, c) telemetry data of the electronic device, d) an alert related to one or more issues with the electronic device, and e) registration information.

Additionally, each embedded device may be implemented as a computing system housed within an electronic or electromechanical device. Each embedded device may be configured to detect operating metrics of the respective electronic or electromechanical device and transmit the operating metrics to a network interface of a managing server (e.g., Trust Service Provider) via the Internet. The embedded devices, in some implementations, may be associated with Internet of Things (IoT) devices.

It may be noted that by inserting the grammar script of the mock attack into each embedded device to be tested, the attack script is run from the embedded devices themselves and not from the server. In this case, the code runs on the device itself, rather than on a simulator. Instead, the simulator can develop the mock attack script and allow the embedded devices to run the script. Based on some selection (e.g., controlled by the server 18, generated randomly, etc.), an embedded device may run one of the attacks (e.g., "Spike Attack") from the list of known attacks described above. By running the mock attacks on the embedded devices themselves, thereby creating attack events, the management program 36 is configured to monitor the events representing the simulated attack. Thus, the actual response to the attacks is not simulated, but are actual device information (e.g., serial number of the device, type of device, how much power the device is using, events detected, a sequence of the events observed, throughput information, metrics, telemetry data, etc.).

Furthermore, instead of running a simulation in some type of sandbox or other controlled or isolated environment, the mock attack (or simulation scheme) can be run directly on the devices to play out the attack scenario in the field. The mock attacks are configured to force the embedded devices to respond in a certain way (e.g., based on what the embedded devices might interpret as a real attack). However, it should be noted that the mock attacks do not force the embedded device to perform any actions that can pose any type of risk on any part of the system 10, including the embedded devices 12 themselves. The simulation scheme may run some type of mock attack. Alerts from the embedded devices may be provided to the server 18. These alerts may include, for example, an alteration to some system files, a creation of temp files, etc.

In some embodiments, certain types of simulations (e.g., deployment simulations and/or attack simulations) may be directed to certain types of embedded devices. For example, embedded devices associated with kitchen appliances may be related to certain deployment patterns and/or certain attacks, and thereby, the embodiments of the present disclosure may be configured to keep track of these correlations and apply suitable simulations for those devices. According to example where embedded devices are associated with assembly line robotics, the type of deployment patterns and attacks might be different from other types of devices, and thereby, other simulations may be directed to these devices.

Furthermore, these correlations may be monitored and updated as needed based on real-world observations. For example, when a vendor plans to deploy a number of embedded devices into the system 10, the details of the deployment can be used to update the deployment simulator 46 as needed. Also, as new attacks and malware instances are tracked and analyzed, which may be the result of extensive research, the attack simulator 48 can be updated to handle these new attacks. In a sense, this updating process is configured to keep the management program 36 on top of the latest list of known attacks, attack vectors, etc. to provide zero-day detection capabilities.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A server arranged in a network environment, the server comprising:

a processing device; and a memory device configured to store a management program having logic that enables the processing device to perform steps of incorporating a grammar template into the management program, wherein the management program is configured to manage events originating from embedded devices deployed in the network environment, and wherein the grammar template is configured to simulate events associated with the embedded devices by defining a base grammar and injecting randomization components into the base grammar, and cause execution of the grammar template by transmitting the grammar template from the server to one or more embedded devices deployed in the network environment and causing each of the one or more embedded devices outside of a sandbox environment, to locally execute the grammar template to simulate the events associated with the embedded devices.

2. The server of claim 1, wherein the grammar template includes the base grammar and an extension, and wherein the extension is configured to inject randomization components into the base grammar.

3. The server of claim 1, wherein the management program includes a simulation module configured to simulate the events associated with the embedded devices according to the grammar template.

4. The server of claim 3, wherein the simulation module includes a device simulator configured to simulate events associated with a deployment of the embedded devices in the network environment.

5. The server of claim 3, wherein the simulation module includes an attack simulator configured to simulate events associated with a mock attack on embedded devices deployed in the network environment.

6. The server of claim 5, wherein the attack simulator is configured to receive telemetry data from one or more of the embedded devices being exposed to the mock attack to determine whether the management program is able to identify the mock attack and respond appropriately.

7. The server of claim 1, wherein the management program includes a monitoring module configured to monitor the embedded devices when the embedded devices are deployed within or outside a perimeter of the network environment.

8. The server of claim 7, wherein the monitoring module is configured to receive information from each of the embedded devices related to one or more of a) an identifier of the embedded device, b) an identifier of an electronic device in which the embedded device is housed, c) telemetry data of the electronic device, d) an alert related to one or more issues with the electronic device, and e) registration information.

9. The server of claim 1, further comprising a network interface enabling access to the Internet, wherein each embedded device is a computing system housed within an electronic or electromechanical device, and wherein each embedded device is configured to detect operating metrics of the respective electronic or electromechanical device and transmit the operating metrics to the network interface via the Internet.

10. The server of claim 9, wherein the embedded devices are associated with Internet of Things (IoT) devices.

11. The server of claim 1, wherein the server is part of a Trust Service Provider (TSP).

12. A non-transitory computer-readable medium configured to store computer logic having instructions that, when executed, cause one or more processing devices to:

incorporate a grammar template into a management program, wherein the management program is configured to manage embedded devices deployed in a network environment, and wherein the grammar template is configured to simulate events associated with the embedded devices by defining a base grammar and injecting randomization components into the base grammar; and cause execution of the grammar template by transmitting the grammar template from the server to one or more embedded devices deployed in the network environment and causing each of the one or more embedded devices, outside of a sandbox environment, to locally execute the grammar template to simulate the events associated with the embedded devices.

13. The non-transitory computer-readable medium of claim 12, wherein the grammar template includes the base grammar and an extension, and wherein the extension is configured to inject randomization components into the base grammar.

14. The non-transitory computer-readable medium of claim 12, wherein the management program includes a simulation module configured to simulate the events associated with the embedded devices according to the grammar template.

15. The non-transitory computer-readable medium of claim 14, wherein the simulation module includes a deployment simulator configured to simulate events associated with a deployment of the embedded devices in the network environment.

16. The non-transitory computer-readable medium of claim 14, wherein the simulation module includes an attack simulator configured to simulate events associated with a mock attack on embedded devices deployed in the network environment.

17. The non-transitory computer-readable medium of claim 16, wherein the attack simulator is configured to receive telemetry data from one or more of the embedded devices being exposed to the mock attack to determine whether the management program is able to identify the mock attack and respond appropriately.

18. A method comprising the steps of:

incorporating a grammar template into a management program of a server, wherein the management program is configured to manage embedded devices deployed in a network environment, and wherein the grammar template is configured to simulate events associated with the embedded devices by defining a base grammar and injecting randomization components into the base grammar, and cause execution of the grammar template by transmitting the grammar template from the server to one or more embedded devices deployed in the network environment and causing each of the one or more embedded devices outside of a sandbox environment, to locally execute the grammar template to simulate the events associated with the embedded devices.

19. The method of claim 18, wherein the management program includes a monitoring module configured to monitor the embedded devices when the embedded devices are deployed within or outside the network environment, and wherein the monitoring module is configured to receive information from each of the embedded devices related to one or more of a) an identifier of the embedded device, b) an identifier of an electronic device in which the embedded device is housed, c) telemetry data of the electronic device, d) an alert related to one or more issues with the electronic device, and e) registration information.

20. The method of claim 18, wherein each embedded device is a computing system housed within an electronic or electromechanical device, and wherein each embedded device is configured to detect operating metrics of the respective electronic or electromechanical device and transmit the operating metrics to the management program via the Internet.

* * * * *